US012553180B2

(12) United States Patent
Leksmon et al.

(10) Patent No.: US 12,553,180 B2
(45) Date of Patent: Feb. 17, 2026

(54) OPTIMIZATION OF CHEMICAL CONSUMPTION IN BIOMASS DELIGNIFICATION (71) Applicant: SixRing Inc., Calgary (CA)

(72) Inventors: Tenzin Leksmon, Calgary (CA); Leah Fraiberg, Calgary (CA); Emhemmed Youssef, Calgary (CA); Markus Weissenberger, Calgary (CA)

(73) Assignee: SixRing Inc., Calgary (CA)

( * ) Notice: Subject to any disclaimer, the term of this patent is extended or adjusted under 35 U.S.C. 154(b) by 189 days.

(21) Appl. No.: 18/447,930

(22) Filed: Aug. 10, 2023

(65) Prior Publication Data

US 2024/0052566 A1  Feb. 15, 2024

(30) Foreign Application Priority Data

Aug. 12, 2022 (CA) ...................... 3170366

(51) Int. Cl.
*D21C 3/04* (2006.01)
*D21C 3/22* (2006.01)
*D21C 3/26* (2006.01)
*D21C 7/08* (2006.01)
*D21C 7/10* (2006.01)

(52) U.S. Cl.
CPC .............. *D21C 3/04* (2013.01); *D21C 3/222* (2013.01); *D21C 3/266* (2013.01); *D21C 7/08* (2013.01); *D21C 7/10* (2013.01)

(58) Field of Classification Search
CPC . D21C 3/04; D21C 3/222; D21C 1/04; D21C 3/26; D21C 3/263; D21C 3/266
See application file for complete search history.

(56) References Cited

U.S. PATENT DOCUMENTS 5,080,756 A    1/1992  Kutney et al.
5,246,543 A *  9/1993  Meier ................ D21C 9/147
                                                    162/76

(Continued)

FOREIGN PATENT DOCUMENTS

EP        1505199 A1 *  2/2005  ............. D21C 9/002
WO    WO-9802612 A1 *  1/1998  ............. D21C 5/005
WO  WO-2010139589 A1 * 12/2010  ............... D21C 1/08

*Primary Examiner* — Anthony Calandra
(74) *Attorney, Agent, or Firm* — Berg Hill Greenleaf Ruscitti LLP (57) ABSTRACT A process to perform a controlled exothermic delignification of biomass comprises providing a system having a first vessel and a second vessel, providing a biomass comprising lignin, hemicellulose and cellulose fibers placed into the first vessel, providing an aqueous acidic composition comprising a sulfuric acid component, providing a modifier component and providing a peroxide component. The biomass is exposed to the sulfuric acid component and peroxide component, thereby creating a reaction mass. The reaction mass is mixed and the sulfuric acid, modifier and peroxide components are allowed to come into contact with the biomass for a period of time sufficient for a delignification reaction to occur and to remove a predetermined amount of the lignin from the biomass. The predetermined amount is assessed by testing a first kappa number of the biomass. When the first kappa number of the biomass is reached, the biomass is transferred to the second vessel.

14 Claims, 2 Drawing Sheets (56) References Cited

U.S. PATENT DOCUMENTS

| | | | | |
|---|---|---|---|---|
| 5,433,825 | A * | 7/1995 | Minor | D21C 3/006 |
| | | | | 162/86 |
| 9,394,648 | B2 * | 7/2016 | Fougere | D21B 1/021 |
| 10,006,167 | B2 * | 6/2018 | Atici | D21C 3/00 |
| 11,982,051 | B2 * | 5/2024 | Weissenberger | D21C 3/003 |
| 12,195,919 | B2 * | 1/2025 | Leach | D21C 3/02 |
| 2025/0052002 | A1 * | 2/2025 | Leksmon | D21C 1/04 |

* cited by examiner

OPTIMIZATION OF CHEMICAL CONSUMPTION IN BIOMASS DELIGNIFICATION

CROSS REFERENCE TO RELATED APPLICATION

This application claims the benefit of and priority to Canadian Patent Application No. 3,170,366, filed Aug. 12, 2022. The entire specification and figures of the above-referenced application are hereby incorporated in its entirety by reference.

FIELD OF THE INVENTION

The present invention relates to a method and system for pulping biomass (referred to as "chips") in a treatment vessel, more specifically to perform a continuous pulping process under low operating conditions

BACKGROUND OF THE INVENTION

Petroleum- or fossil fuel-based products include a vast array of products, as surfactants, pharmaceuticals, plastics and elastomers which are abundant in all aspects of manufacturing consumer products and fuels which are used to power vehicles, homes and industries. Climate change and environmental pressures are forcing society to find alternatives to fossil fuels and petroleum-based products. A well-known source for non-petroleum-based products is lignocellulosic biomass. This is the single most abundant source of carbon-neutral organic materials on the planet and contains most of the required compounds to sustain multiple industries including, but not limited to, energy production, chemicals, food, pharmaceuticals, concrete, various manufacturing and agriculture applications.

There are billions of tons being produced by biosynthesis every year. However, to efficiently separate the three components of lignocellulosic biomass proves to be a challenge for it to be a strong and legitimate competitor or alternative to petroleum-based products. To benefit from lignocellulosic biomass and to be able to further use it, one must be able to separate out the lignin, from the hemicellulose and the cellulose. Cellulose is an abundant, high molecular weight natural fiber that possesses great strength and biodegradability. Depending on the feedstock, cellulose can make up from 30 to 60 percent or in some cases more of the plant material and is found in trees/forestry residue, algae, crops, straw, municipal and industrial waste, and various plants.

Furthermore, due to cellulose encasement between lignin and hemicellulose, the efficient and commercially viable extraction of cellulose will depend greatly on the method and biomass source used during the extraction process. Many current and proposed processing methods may limit the use or alter the structural integrity of the cellulose resulting in a marginal yield and excessive processing costs. In general, cellulose extracted from plant materials contains both an amorphous region and a crystalline region.

It is widely agreed that the technical difficulties in the processes, which are currently inefficient, expensive and difficult to scale, of separating lignin and hemicellulose from the cellulose in the biomass is what prevents such technology from being a viable alternative for petroleum-based or fossil fuel products.

The first step in paper production and most energy-intensive one is the production of pulp. Notwithstanding water, wood and other plant materials used to make pulp contain three main components: cellulose fibers; lignin; and hemicelluloses. Pulping has a primary goal to separate the fibers from the lignin. Lignin is a three-dimensional cross-linked polymer which figuratively acts as a mortar to hold all the fibers together within the plant. Its presence in finished pulp is undesirable and adds nothing to the finished product. Pulping wood refers to breaking down the bulk structure of the fibre source, be it chips, stems or other plant parts, into the constituent fibres. The cellulose fibers are the most desired component when papermaking is involved. Hemicelluloses are shorter branched carbohydrate polymers consisting of various monosacharides which form a random amorphous polymeric structure. The presence of hemicellulose after biomass conversion is less desirable as biomass conversion requires the further breakdown to monosacharides as a desired outcome while a pulp & paper process normally stops right after lignin dissolution. In fact, hemicellulose is desired in finished pulp as it acts much like a glue for the cellulose fibers during papermaking.

There are two main approaches to preparing wood pulp or woody biomass: mechanical treatment and chemical treatment. Mechanical treatment or pulping generally consists of mechanically tearing the wood chips apart and, thus, tearing cellulose fibres apart in an effort to separate them from each other. The shortcomings of this approach include: broken cellulose fibres, thus shorter fibres and lignin being left on the cellulose fibres thus being inefficient or non-optimal. This process also consumes large amounts of energy and is capital intensive. There are several approaches included in chemical pulping. These are generally aimed at the degradation of the lignin and hemicellulose into small, water-soluble molecules. These now degraded components can be separated from the cellulose fibres by washing and filtering the latter without depolymerizing the cellulose fibres. The chemical process is currently energy intensive as well as high amounts of heat and/or higher pressures are typically required; in many cases, agitation or mechanical intervention are also required, further adding inefficiencies and costs to the process.

There exist pulping or treatment methods which combine, to a various extent, the chemical aspects of pulping with the mechanical aspects of pulping. To name a few, one must consider thermomechanical pulping (also commonly referred to as TMP), and chemi-thermomechanical pulping (CTMP). Through a selection of the advantages provided by each general pulping method, the treatments are designed to reduce the amount of energy required by the mechanical aspect of the pulping treatment. This can also directly impact the strength or tensile strength degradation of the fibres subjected to these combination pulping approaches. Generally, these approaches involve a shortened chemical treatment (compared to conventional exclusive chemical pulping) which is then typically followed by mechanical treatment to separate the fibres.

The most common process to make pulp for paper production is the kraft process. In the kraft process, wood chips are converted to wood pulp which is almost entirely pure cellulose fibers. The multi-step kraft process consists of a first step where wood chips are impregnated/treated with a chemical solution. This is done by soaking the wood chips and then pre-heating them with steam. This step swells the wood chips and expels the air present in them and replaces the air with the liquid. This produces black liquor a resultant by-product from the kraft process. It contains water, lignin residues, hemicellulose and inorganic chemicals. White liquor is a strong alkaline solution comprising sodium hydroxide and sodium sulfide. Once the wood chips have been soaked in the various chemical solutions, they undergo cooking. To achieve delignification in the wood chips, the cooking is carried out for several hours at temperatures reaching up to 176° C. At these temperatures, the lignin degrades to yield water soluble fragments. The remaining cellulosic fibers are collected and washed after the cooking step.

U.S. Pat. No. 5,080,756 teaches an improved kraft pulping process and is characterized by the addition of a spent concentrated sulfuric acid composition containing organic matter to a kraft recovery system to provide a mixture enriched in its total sulfur content that is subjected to dehydration, pyrolysis and reduction in a recovery furnace. The organic matter of the sulfuric acid composition is particularly beneficial as a source of thermal energy that enables high heat levels to be easily maintained to facilitate the oxidation and reduction reactions that take place in the furnace, thus resulting in the formation of sulfide used for the preparation of cooking liquor suitable for pulping.

Caro's acid, also known as peroxymonosulfuric acid ($H_2SO_5$), is one of the strongest oxidants known. There are several known reactions for the preparation of Caro's acid but one of the most straightforward involves the reaction between sulfuric acid ($H_2SO_4$) and hydrogen peroxide ($H_2O_2$). Preparing Caro's acid in this method allows one yield in a further reaction potassium monopersulfate (PMPS) which is a valuable bleaching agent and oxidizer. While Caro's acid has several known useful applications, one noteworthy is its use in the delignification of wood. For the pulping of bagasee, it has been proposed as part of a two-stage pulping technique (sodium hydroxide stage followed by Caro's acid stage) or a three-stage pulping technique (sodium hydroxide stage followed by Caro's acid stage which is followed by another sodium hydroxide stage).

Other methods have been developed for pretreating lignocellulosic feedstocks. These pretreatment methods include dilute acid pretreatment, steam explosion ($CO_2$ explosion), pH-controlled water pretreatment, ammonia fibre expansion, ammonia recycle percolation (ARP), and lime pretreatment (Mosier et al. 2005; Wyman et al. 2005; Yang and Wyman 2008). One approach involves the concept of organosolv. Organosolv pulping is the process to extract lignin from ligocellulosic feedstocks with organic solvents or their aqueous solutions. Organosolv pulping has attracted interest since the 1970's because the conventional pulping processes, kraft and sulfite processes, have some serious shortcomings such as air and water pollution. Organosolv pretreatment is similar to organosolv pulping, but the degree of delignification for pretreatment is not expected/required to be as high as that of pulping. However, a drawback of organosolv pre-treatment is the high temperatures at which the processes are known to be carried out at, upwards of 100-250° C., often times in the range of 185-210° C. Such temperatures require high energy inputs.

Improved processes for delignification need to take into account environmental aspects as well as end-product generation. Ambient temperature processes (20-25 degrees Celsius) are highly desirable as they do not require energy intensive inputs. However, to carry out delignification operations at low temperatures and atmospheric pressure, strong acids are typically required. The strength of the acids used while sufficient to remove lignin present on the lignocellulosic feedstock, can be deleterious to the lignin as it decomposes it beyond any lignin monomers which would be useable in other industries or applications, but can also damage the cellulose being yielded and therefore fail in delivering useable products from said feedstock. A common drawback of using strong acids on cellulose includes darkening of the cellulose. The acids act as dehydrating agents that remove water molecules from the cellulose and leave behind carbon residues during a highly exothermic reaction. which indicates that glucose units present the cellulose have been destroyed leaving the carbon behind.

Biofuel production is another potential application for the kraft process. One of the current drawbacks of biofuel production is that it requires the use of food grade plant parts (such as seeds) in order to transform carbohydrates into fuel in a reasonably efficient process. The monosaccharides (mainly glucose) could be obtained from cellulosic fibers, by using non-food grade biomass in the kraft process; however, the energy intensive nature of the kraft process for delignification makes this a less commercially viable option. In order to build a plant based chemical resource cycle, there is a great need for energy efficient processes which can utilize plant-based feedstocks that don't compete with human food production.

In addition to the recovery of cellulose, the recovery of lignin is increasingly important. Most conversion technologies relating to dissolved lignin use heat and metal catalysts to effectively break down lignin into low molecular weight aromatics which hold value for other uses/applications across industry. Some of the considerations to take into account when exploring various processes include: efficiency of the catalysts used; the stability of the catalysts; Catalyst selectivity; control of the condensation and repolymerization reactions of lignin. The condensation and repolymerization of lignin often yield products which cannot be broken down easily using the conventional approaches and therefore lose a tremendous amount of value in terms of future uses/applications in industry. The condensation and repolymerization of lignin have a direct impact on the recovery of target lignin products (such as low molecular weight phenolic compounds). Thus, avoiding the condensation and repolymerization reactions is critical in order to maximize the yields of the target products.

The lignin repolymerization has been a substantial concern during many stages of the process of the delignification of lignocellulosic biomass. Conventional fractionation process, namely biomass pre-treatment, focuses on its effectiveness to remove lignin from biomass structure, generally employing acid or base catalysts. The resulting residual solid, mainly lignin, significantly undergoes irreversible repolymerization depending on the pre-treatment conditions. This is an outcome which must be avoided in order to extract maximum value from a treatment which is geared at recovering both cellulose and lignin for future uses.

While the kraft pulping process is the most widely used chemical pulping process in the world, it is extremely energy intensive and has many drawbacks, for example, substantial odours emitted around pulp producing plants or general emissions that are now being highly regulated in many pulp and paper producing jurisdictions. In light of the current environmental, economic and climactic changes, along with emission fees being implemented, it is highly desirable to optimize the current pulping processes. In order to provide at least linear quality fibres without the current substantial detriment to the environment during the production thereof. Accordingly, there still exists a need for a composition capable of performing delignification on wood substance under reduced temperatures and pressures versus what is currently in use without requiring any additional capital expenditures.

Accordingly, there still exists a need for a system and a process capable of performing delignification on lignocellulosic biomass under reduced temperatures and pressures versus what is currently in use without requiring any major additional capital expenditures and adapted to preserve the lignocellulosic biomass constituents as much as possible for further applications. The inventors have developed an improved delignification system and process which is more in line with the increasing environmental constraints and regulations which are put in place by governments across the globe.

SUMMARY OF THE INVENTION

According to a preferred embodiment of the present invention, the process utilizes a process of chemical impregnation of biomass with a chemical blend which uses the reaction heat (reaction enthalpy) released during the reaction to increase the temperature of the reaction mixture. Preferably, there is very little external heat as input into the reaction mixture. This distinguishes the present process from conventional pulping processes such as kraft pulping.

It has been unexpectedly discovered by the inventors that by separating the delignification process into distinct steps, it has been possible to achieve a more efficient consumption of the chemicals used in the delignification reaction as well as to speed up the time of reaction to achieve complete or substantially complete delignification under conditions which are substantially less energy-intensive than those conventionally employed such as kraft pulping. According to a preferred embodiment of the present invention, the consumption of peroxide has been such that the initial concentration of peroxide in the reaction mass was in the range of approximately 10%, and following the reaction, the concentration of peroxide was roughly 2%. Without a continuous process such as the one described in the present invention, the consumption of peroxide is much lower, which in turn, leads to a larger volume of such being wasted and hence higher operating costs and related costs.

According to a preferred embodiment of the present invention, the process utilizes a system comprising a single reactor separated into multiple stages. Preferably, the process utilizes a system comprising a single reactor separated in a number of stages ranging from 2 to 6 stages. More preferably, the process utilizes a system comprising a single reactor separated in 3 stages.

Each stage comprises a variety of components but which are more readily identified by their residence time being mainly dictated by the kappa number which needs to be achieved to move on to a subsequent stage. The kappa number is a measure of the residual lignin content obtained after pulping. It is used to assess the effectiveness of a pulping stage which typically results in partial delignification of the pulp. The extent of delignification is measured to determine the amount of chemicals necessary prior to performing a bleaching step of the pulp in a conventional process such as kraft. For example, the Kappa number for bleachable pulps is typically in the 25 to 30 range, while pulps used to make corrugated fiberboard (to make cardboard) is typically in the 60 to 110 range.

The kappa numbers are assessed by using online kappa analyzers. An advanced process control system equips the reactor with the required control plan. This control system links the information transmitted by the kappa number analyzers, temperature, and residence time and adjusts the process variables according to the set points and transfer of reactants from one stage to the next one. Implementation of this system and accompanying process allows to achieve a full or substantially full delignification of the input biomass. Preferably, when the process controls are optimized and the reaction mixture transfers between the reaction vessels are performed seamlessly, the system acts much like a continuous process reactor.

According to a preferred embodiment of the present invention, there is provided a system comprising at least two vessels adapted to receive biomass and a delignification liquid; wherein said at least two vessels are placed in succession.

According to a preferred embodiment of the present invention, there is provided a system for the continuous delignification of biomass. Preferably, said system comprises at least two in-line vessels, where a delignification reaction occurs. Preferably, said system comprises a first vessel operating at a first temperature, where said biomass having a first kappa number is mixed with a delignification composition for a pre-determined time or until the biomass reaches a pre-determined second kappa number. Preferably, once the biomass reaches a pre-determined second kappa number the biomass is then transferred to a second vessel where the delignification reaction occurs at a second temperature which is set slightly higher than said first temperature to speed up the reaction via increasing the reaction rate. Said biomass having said second kappa number continues to be mixed with said delignification composition for a pre-determined time or until the biomass reaches a pre-determined third kappa number. Preferably, once the biomass reaches said pre-determined third kappa number the biomass is then transferred to a third vessel where the delignification reaction occurs at a third temperature which is set slightly higher than said second temperature. Said biomass having said third kappa number continues to be mixed with said delignification composition for a pre-determined time or until the biomass reaches a pre-determined fourth and final kappa number. Preferably, once the biomass reaches said pre-determined fourth kappa number, the reaction mixture is then discharged and the solid portion is separated from the liquid portion and the liquid is recovered and re-inserted into the process by injecting it into the first vessel to utilize peroxide consumption According to a preferred embodiment of the present invention, the system further comprises of a temperature indicator/controller which is designed to monitor changes in temperature set point and feed data into the APC [Advance process control] to maintain desired conditions According to a preferred embodiment of the present invention, the system further comprises jet nozzles on the center main piping system which are designed to provide mixing of the biomass & chemical solution inside the vessel.

According to a preferred embodiment of the present invention, the system further comprises an extraction screen for the liquid chemical solution which is designed to extract chemical solution from the vessel to pump into jet nozzles and the external heat exchanger According to a preferred embodiment of the present invention, the system further comprises a Heat/Cooling Jacket which is designed to be a secondary temperature control method for maintaining the temperature setpoint.

According to a preferred embodiment of the present invention, the system further comprises an actuated discharge valve which is designed to discharge product slurry into the next stage once inline analyzers meet conditions or based on a pre-determined time According to a preferred embodiment of the present invention, the system further comprises a heat exchanger designed to be the primary method to chill or heat solution to the desired setpoint.

According to a preferred embodiment of the present invention, the system further comprises a central main piping system which is a piping system designed to distribute the chemical solution to biomass and chemical blend inside the vessel.

According to a preferred embodiment of the present invention, the system further comprises a Kappa analyzer at each stage/vessel to determine the pulping percentage of biomass.

According to a preferred embodiment of the present invention, the system further comprises at least one tank baffle which is designed to increase mixing efficiency as well as increase cooling/heating surface area by acting as a tertiary temperature control by allowing heat/cool fluid to enter via baffle.

According to a preferred embodiment of the present invention, the system further comprises a cone bottom which is desirable for easier reaction mixture discharging from one vessel to the next.

According to a preferred embodiment of the present invention, the system further comprises a top mount agitator which is designed to provide the desired agitation to the reaction mixture.

According to yet another aspect of the present invention, there is provided a process to delignify biomass, said process comprises the steps:
   providing a vessel;
   providing biomass comprising lignin, hemicellulose, and cellulose fibers into the said vessel;
   providing an aqueous acidic composition comprising a sulfuric acid component;
   providing a modifier component;
   providing a peroxide component;
   exposing said biomass to said sulfuric acid source and peroxide component, creating a reaction mass;
   allowing said sulfuric acid source and peroxide component to come into contact with said biomass for a time sufficient for a delignification reaction to occur and remove over 90 wt % of said lignin and hemicellulose from said biomass; and
   controlling the temperature of the delignification reaction by controlling the addition of biomass into said vessel.

According to yet another aspect of the present invention, there is provided a process to perform a controlled exothermic delignification of biomass, said process comprising the steps of:
   providing a system comprising at least a first vessel and a second vessel;
   providing said biomass comprising lignin, hemicellulose and cellulose fibers into said first vessel;
   providing an aqueous acidic composition comprising a sulfuric acid component;
   providing a modifier component;
   providing a peroxide component;
   exposing said biomass to said sulfuric acid component and peroxide component, creating a reaction mass;
   mixing said reaction mass;
   allowing said sulfuric acid component and peroxide component to come into contact with said biomass for a period of time sufficient to a delignification reaction to occur and remove a pre-determined amount of said lignin from said biomass;
wherein said pre-determined amount is assessed by testing a first kappa number, with a suitable apparatus, of the biomass, when said first kappa number of said biomass is reached, the biomass is transferred to said second vessel;
   allowing the temperature of the biomass mixture to increase during the residence time of said biomass in said second vessel;
   allowing said sulfuric acid component and peroxide component to continue said delignification reaction at said second temperature and remove a second pre-determined amount of said lignin from said biomass;
wherein said second pre-determined amount is assessed by testing a second kappa number, with a suitable apparatus, of the biomass, when said second kappa number of said biomass is reached, the biomass is removed from said second vessel;
   optionally, a washing step is employed to separate a resulting liquid portion comprising said lignin and hemicellulose from the solid portion containing the cellulose extracted from the biomass.

Preferably, said system comprises a third vessel where the biomass is sent to after being removed form said second vessel,
   allowing the temperature of the biomass mixture to increase during the residence time of said biomass in said second vessel;
   allowing said sulfuric acid component and peroxide component to continue said delignification reaction at said second temperature and remove a third pre-determined amount of said lignin from said biomass;
wherein said third pre-determined amount is assessed by testing a third kappa number, with a suitable apparatus, of the biomass, when said third kappa number of said biomass is reached, the biomass is removed from said third vessel.

According to a preferred embodiment of the present invention, the temperature of the reaction mass is kept below 55° C. for the duration of the delignification reaction. Preferably, the temperature of the reaction mass is kept below 50° C. for the duration of the delignification reaction. Preferably, the temperature of the reaction mass is kept below 45° C. for the duration of the delignification reaction. Preferably, the reaction temperature is controlled in the 30-45° C. range to achieve optimum reaction time, and at least 90% delignification. According to a preferred embodiment of the present invention, the temperature of the reaction mass is kept below 55° C. as a maximum upper temperature, as it has been noted that above this temperature the reaction tends to run away and becomes more difficult to control with external temperature controls. If the reaction temperature goes up too fast it can become necessary to add water to control or kill the reaction. Preferably, the reaction temperature is kept between 30 and 45° C. and even more preferably from 35 to 40° C.

According to a preferred embodiment of the present invention, the initial temperature of the reaction mass is no more than 40° C. and does not exceed 55° C. for the duration of the delignification reaction. Preferably, the initial temperature of the reaction mass is no more than 35° C. and does not exceed 55° C. for the duration of the delignification reaction. More preferably, the initial temperature of the reaction mass is no more than 30° C. and does not exceed 55° C. for the duration of the delignification reaction. Preferably also, the initial temperature of the reaction mass is no more than 25° C. and does not exceed 55° C. for the duration of the delignification reaction.

According to a preferred embodiment of the present invention, the temperature of the reaction mass is controlled throughout the delignification reaction to subsequent additions of a solvent (water) to progressively lower the slope of temperature increase per minute from less than 1° C. per minute to less than 0.5° C. per minute.

According to another preferred embodiment of the present invention, the temperature of the mixture reaction mass is controlled by addition of a solvent (water) to reduce the slope of temperature increase per minute of the reaction mass to less than 1° C. per minute.

According to yet another preferred embodiment of the present invention, the temperature of the mixture reaction mass is controlled by the second addition of a solvent (water) to reduce the slope of temperature increase per minute of the reaction mass to less than 0.7° C. per minute.

Preferably, the temperature of the reaction mass is controlled by the third addition of a solvent (water) to reduce the slope of temperature increase per minute of the reaction mass to less than 0.3° C. per minute.

Preferably, the temperature of the reaction mass is controlled by the fourth addition of a solvent (water) to reduce the slope of temperature increase per minute of the reaction mass to less than 0.1° C. per minute.

According to a preferred embodiment of the present invention, the kappa number of the resulting cellulose is below 10, preferably the kappa number of the resulting cellulose is below 5.

According to a preferred embodiment of the present invention, there is provided a process to delignify biomass using an aqueous acidic composition comprising:
sulfuric acid;
a heterocyclic compound; and
a peroxide.

According to yet another aspect of the present invention, there is provided a process to perform a controlled exothermic delignification of biomass, said process comprising the steps:
providing a vessel;
providing a biomass batch comprising lignin, hemicellulose, and cellulose fibers into the said vessel;
providing a modified Caro's acid composition selected from the group consisting of composition A; composition B and Composition C;
wherein said composition A comprises:
sulfuric acid in an amount ranging from 20 to 70 wt % of the total weight of the composition;
a modifier component comprising an amine moiety and a sulfonic acid moiety selected from the group consisting of: taurine; taurine derivatives; and taurine-related compounds; and
a peroxide;
wherein said composition B comprises:
an alkyl sulfonic acid; and
a peroxide; wherein the acid is present in an amount ranging from 40 to 80 wt % of the total weight of the composition and where the peroxide is present in an amount ranging from 10 to 40 wt % of the total weight of the composition;
wherein said composition C comprises:
sulfuric acid;
a two-part modifier component comprising:
a compound comprising an amine moiety; and
a compound comprising a sulfonic acid moiety; and
a peroxide;
exposing said biomass to said modified Caro's acid composition, creating a reaction mass;
allowing said modified Caro's acid composition to come into contact with said biomass for a while sufficient for a delignification reaction to occur and remove over 90 wt % of said lignin and hemicellulose from said biomass; and controlling the temperature of the delignification reaction to maintain it below 55° C. by a method selected from the group consisting of:
adding water into the said vessel;
adding biomass into the said vessel; and
using a heat exchanger.

According to a preferred embodiment of the present invention, the temperature of the reaction mass is maintained at a temperature ranging from 30-45° C.

According to a preferred embodiment of the present invention, at least part of the resulting liquid portion obtained at the end of the reaction is used to treat at least one additional biomass batch.

According to a preferred embodiment of the present invention, at least part of the resulting liquid portion obtained at the end of the reaction is used to treat at least four additional biomass batches.

According to a preferred embodiment of the present invention, the at least part of the resulting liquid portion obtained at the end of the reaction is used to further treat additional biomass batches until the peroxide concentration in said resulting liquid reaches less than 1%.

According to a preferred embodiment of the present invention, the aqueous acidic composition combines both the sulfuric acid component and the peroxide component and, as such, comprises:
a modified Caro's acid composition selected from the group consisting of: composition A; composition B and Composition C;
wherein said composition A comprises:
sulfuric acid in an amount ranging from 20 to 70 wt % of the total weight of the composition;
a modifier component comprising an amine moiety and a sulfonic acid moiety selected from the group consisting of: taurine; taurine derivatives; and taurine-related compounds; and
a peroxide;
wherein said composition B comprises:
an alkylsulfonic acid; and
a peroxide; wherein the acid is present in an amount ranging from 40 to 80 wt % of the total weight of the composition and where the peroxide is present in an amount ranging from 10 to 40 wt % of the total weight of the composition;
wherein said composition C comprises:
sulfuric acid;
a two-part modifier comprising:
a compound comprising an amine moiety; and
a compound comprising a sulfonic acid moiety; and
a peroxide.

According to a preferred embodiment of the present invention, said sulfuric acid, said compound comprising an amine moiety and a sulfonic acid moiety, and said peroxide is present in a molar ratio of no less than 1:1:1.

According to a preferred embodiment of the present invention, said sulfuric acid, said compound comprising an amine moiety and a sulfonic acid moiety, and said peroxide is present in a molar ratio of no more than 15:1:1.

According to a preferred embodiment of the present invention, said sulfuric acid and said compound comprising an amine moiety and a sulfonic acid moiety is present in a molar ratio of no less than 3.1.

According to a preferred embodiment of the present invention, said compound comprising an amine moiety and a sulfonic acid moiety is selected from the group consisting of: taurine; taurine derivatives; and taurine-related compounds.

According to a preferred embodiment of the present invention, said taurine derivative or taurine-related compound is selected from the group consisting of: taurolidine; taurocholic acid; tauroselcholic acid; tauromustine; 5-taurinomethyluridine and 5-taurinomethyl-2-thiouridine; homotaurine (tramiprosate); acamprosate; and taurates; as well as aminoalkylsulfonic acids where the alkyl is selected from the group consisting of $C_1$-$C_5$ linear alkyl and $C_1$-$C_5$ branched alkyl. Preferably, said linear alkylaminosulfonic acid is selected form the group consisting of: methyl; ethyl (taurine); propyl; and butyl. Preferably, said branched aminoalkylsulfonic acid is selected from the group consisting of: isopropyl; isobutyl; and isopentyl.

According to a preferred embodiment of the present invention, said compound comprising an amine moiety and a sulfonic acid moiety is taurine.

According to a preferred embodiment of the present invention, said sulfuric acid and compound comprising an amine moiety and a sulfonic acid moiety are present in a molar ratio of no less than 3:1.

According to a preferred embodiment of the present invention, said compound comprising an amine moiety is an alkanolamine is selected from the group consisting of: monoethanolamine; diethanolamine; triethanolamine; and combinations thereof.

According to a preferred embodiment of the present invention, said compound comprising a sulfonic acid moiety is selected from the group consisting of: alkylsulfonic acids and combinations thereof.

According to a preferred embodiment of the present invention, said alkylsulfonic acid is selected from the group consisting of: alkylsulfonic acids where the alkyl groups range from $C_1$-$C_6$ and are linear or branched; and combinations thereof.

According to a preferred embodiment of the present invention, said alkylsulfonic acid is selected from the group consisting of: methanesulfonic acid; ethanesulfonic acid; propanesulfonic acid; 2-propanesulfonic acid; isobutylsulfonic acid; t-butylsulfonic acid; butanesulfonic acid; iso-pentylsulfonic acid; t-pentylsulfonic acid; pentanesulfonic acid; t-butylhexanesulfonic acid; and combinations thereof.

According to a preferred embodiment of the present invention, said alkylsulfonic acid; and said peroxide are present in a molar ratio of no less than 1:1.

According to a preferred embodiment of the present invention, said compound comprising a sulfonic acid moiety is methanesulfonic acid.

According to a preferred embodiment of the present invention, in Composition C, said sulfuric acid and said a compound comprising an amine moiety and said compound comprising a sulfonic acid moiety are present in a molar ratio of no less than 1:1:1.

According to a preferred embodiment of the present invention, in Composition C, said sulfuric acid, said compound comprising an amine moiety and said compound comprising a sulfonic acid moiety are present in a molar ratio ranging from 28:1:1 to 2:1:1.

According to another preferred embodiment of the present invention, there is provided a process to delignify biomass using an aqueous acidic composition comprising:
sulfuric acid;
a heterocyclic compound; and
wherein sulfuric acid and said a heterocyclic compound; are present in a molar ratio of no less than 1:1.

Preferably, the sulfuric acid and said heterocyclic compound are present in a molar ratio ranging from 28:1 to 2:1 More preferably, the sulfuric acid and heterocyclic compound are present in a molar ratio ranging from 24:1 to 3:1. Preferably, the sulfuric acid and heterocyclic compound are present in a molar ratio ranging from 20:1 to 4:1. More preferably, the sulfuric acid and heterocyclic compound are present in a molar ratio ranging from 16:1 to 5:1. According to a preferred embodiment of the present invention, the sulfuric acid and heterocyclic compound are present in a molar ratio ranging from 12:1 to 6:1.

Also preferably, said heterocyclic compound has a molecular weight below 300 g/mol. Also preferably, said heterocyclic compound has a molecular weight below 150 g/mol. More preferably, said heterocyclic compound is a secondary amine. According to a preferred embodiment of the present invention, said heterocyclic compound is selected from the group consisting of: imidazole; triazole; and N-methylimidazole.

According to an aspect of the present invention, there is provided a process to delignify biomass, such as wood using an aqueous acidic composition comprising:
sulfuric acid;
a heterocyclic compound; and
a peroxide.
wherein the sulfuric acid and the heterocyclic compound are present in a mole ratio ranging from 2:1 to 28:1.

Preferably, for a modified Caro's acid comprising TEOA/MSA, the molar composition is as follows: $H_2O$:$H_2O_2$:$H_2SO_4$:TEOA:MSA in a molar ratio of 56:10:10:1:1.

Preferably, according to an embodiment where water addition into the vessel is avoided to the greatest extent possible, the control of the delignification reaction is done by controlling the temperature of the mixture within the vessel and therefore, the exothermicity of the delignification, the reaction is controlled by slowly adding the biomass into the vessel containing the sulfuric acid component and the peroxide component and allowing the reaction to occur before the addition of more biomass material. Once the reaction of the first amount of biomass has substantially finished more biomass material is added, this additional material will react and will begin to delignify but the reaction will be tempered to a certain extent by the presence of the prior delignified material and thus, cause the second amount of biomass to react in a more diluted mixture and so on, for subsequent additions of biomass into the vessel. According to a preferred embodiment of the present invention, the temperature increase resulting from the delignification reaction (which is exothermic) is utilized to heat the reaction mixture to the desired 30-45° C. range. This coincides with the advanced temperature control system, which allows for self-sufficient heat generation.

According to an aspect of the present invention, there is provided a process to perform a controlled exothermic delignification of biomass, said process consisting of:
providing a vessel;
providing biomass comprising lignin, hemicellulose, and cellulose fibers into the said vessel;
providing an aqueous acidic composition comprising a sulfuric acid component;
providing a modifier component;
providing a peroxide component;
exposing said biomass to said sulfuric acid component, modifier component and peroxide component, creating a reaction mass;
allowing said sulfuric acid component, modifier component and peroxide component to come into contact with said biomass for a while sufficient for a delignification reaction to occur and remove over 90 wt % of said lignin and hemicellulose from said biomass.

BRIEF DESCRIPTION OF THE FIGURES

Features and advantages of embodiments of the present application will become apparent from the following detailed description and the appended figures, which.

DETAILED DESCRIPTION OF EMBODIMENTS OF THE PRESENT INVENTION

According to a preferred embodiment of the present invention, there is provided a process to perform in a controlled exothermic delignification of biomass, said process comprising the steps of:

providing a system comprising at least a first vessel and a second vessel;

providing biomass comprising lignin, hemicellulose and cellulose fibers into said first vessel;

providing an aqueous acidic composition comprising a sulfuric acid component;

providing a modifier component;

providing a peroxide component;

exposing said biomass to said sulfuric acid component and peroxide component, creating a reaction mass;

mixing said reaction mass;

allowing said sulfuric acid component and peroxide component to come into contact with said biomass for a period of time sufficient to a delignification reaction to occur and remove a pre-determined amount of said lignin from said biomass;

wherein said pre-determined amount is assessed by testing a first kappa number, with a suitable apparatus, of the biomass, when said first kappa number of said biomass is reached, the biomass is transferred to said second vessel;

allowing the temperature of the biomass mixture to increase during the residence time of said biomass in said second vessel;

allowing said sulfuric acid component, modifier component and peroxide component to continue said delignification reaction at said second temperature and remove a second pre-determined amount of said lignin from said biomass;

wherein said second pre-determined amount is assessed by testing a second kappa number, with a suitable apparatus, of the biomass, when said second kappa number of said biomass is reached, the biomass is removed from said second vessel;

optionally, a washing step is employed to separate the liquid portion containing said lignin and hemicellulose from the solid portion containing the cellulose extracted from the biomass.

Figure 1:
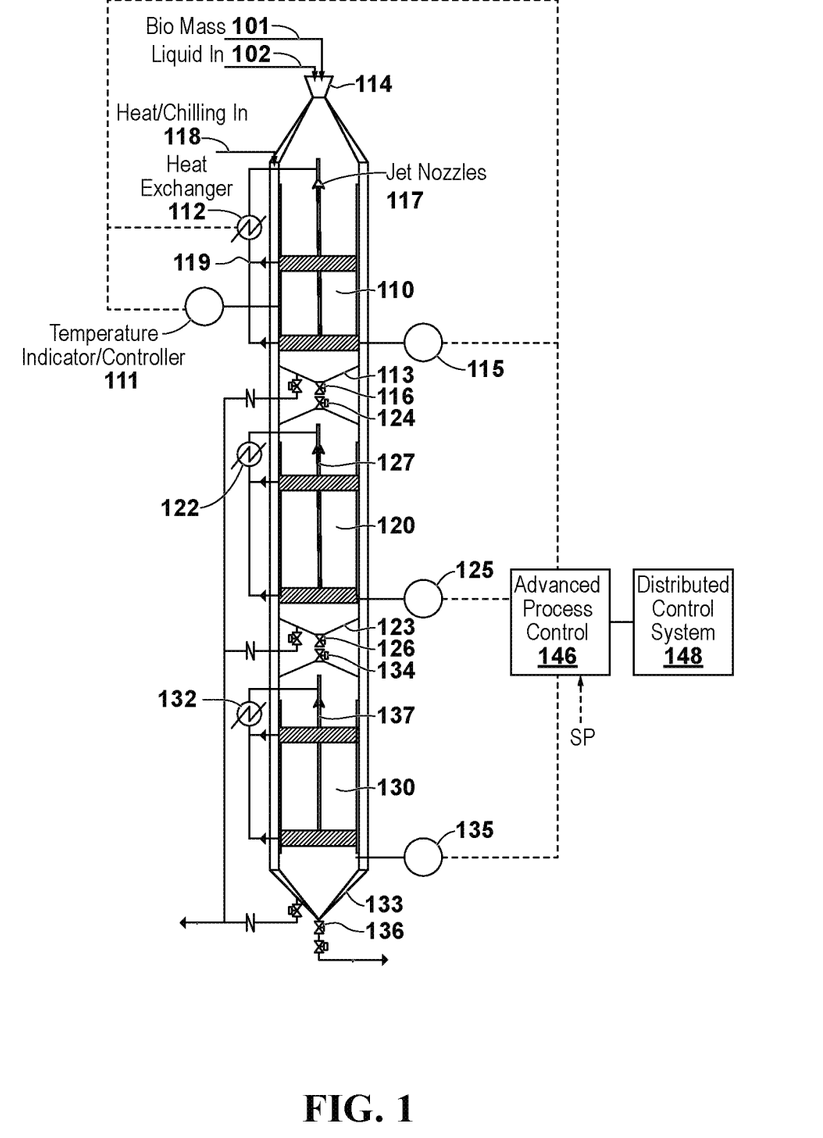
FIG. 1 illustrates a system capable of implementing the process according to a preferred embodiment of the present invention.

The process mentioned hereinabove can be accomplished by using a system as illustrated in FIG. 1. Said system according to a preferred embodiment of the present invention comprises a first vessel (110) operating at a first temperature, where said biomass (101) having a first kappa number is added through an inlet (114) and subsequently mixed with a delignification composition (102) for a pre-determined period of time or until the biomass in the reaction mixture reaches a pre-determined second kappa number, the kappa number during the reaction is measured through the use of a kappa analyzer (115). Preferably, once the biomass in the reaction mixture reaches a pre-determined second kappa number the biomass/delignification composition is then transferred to a second vessel (120) where the delignification reaction occurs at a second temperature which is set higher than said first temperature. Said biomass in the reaction mixture having said second kappa number continues to be mixed with said delignification composition for a predetermined period of time or until the biomass in the reaction mixture reaches a pre-determined third kappa number, the kappa number during the reaction is measured through the use of a kappa analyzer (125) associated with said second vessel (120). Preferably, once the biomass in the reaction mixture reaches said pre-determined third kappa number the biomass/delignification composition is then transferred to a third vessel where the delignification reaction occurs at a third temperature which is set higher than said second temperature. Said biomass in the reaction mixture having said third kappa number continues to be mixed with said delignification composition for a pre-determined period of time or until the biomass reaches a pre-determined fourth and final kappa number, the kappa number during the reaction is measured through the use of a kappa analyzer (135) associated with said second vessel (130). Preferably, once the biomass in the reaction mixture reaches said pre-determined fourth kappa number, the reaction mixture is then discharged and the solid portion is separated from the liquid portion and the liquid is recovered and re-inserted into the process by injecting it into the first vessel. The cellulose comprising the solid portion is subjected to other post-delignification treatment steps depending on the ultimate use thereof. The system comprises a temperature Indicator/Controller (111) which is designed to monitor changes in temperature set point, to control Heat Exchanger (112) setpoint, jet nozzles (117). The jet nozzles (117) on the center main piping system are designed to provide pumping mixing of the biomass & delignification composition (chemical solution). According to a preferred embodiment, the solution is heated and cooled using an external heat exchanger (HE) with the process fluid (cold water or glycol). Liquid is extracted from the tank from the screens and enters the heat exchanger.

According to a preferred embodiment, the secondary heating/cooling is done via a tank jacket.

According to a preferred embodiment of the present invention, the system further comprises an extraction screen for the liquid chemical solution which is designed to extract chemical solution from the vessel to pump into the jet nozzle.

As seen in FIG. 1, the system comprises a heat/cooling jacket (118) which is designed to be a secondary temperature control method for chilling/heating. This can prove to be useful since the delignification reaction is exothermic and control of the temperature is desirable in order to ensure that the yield is maximized.

At the bottom of each of the vessels (110, 120, 130) is located an actuated discharge valve (116, 126 and 136 respectively) which is designed to discharge product slurry (biomass and delignification composition) into next stage. Each vessel (110, 120, 130) is equipped with a heat exchanger (112, 122, and 132, respectively).

The advanced process controls (146) (APC) tool is generally used for individual processes and connects to the and distributed control system (148) (DCS) which is generally in control of the entire process facility. APC is the developed system of integrating multi factors including DCS. The system components virtually communicate with each other and adjust parameters according the programmed inputs. It utilizes real time optimization, reading process variables and continuously adjust for the target range it is programmed for.

The system also comprises a chiller & heater feed loop (119) which is designed to be the primary method to chill/heat solution to desired parameters.

In the embodiment illustrated in FIG. 1, the system further comprises a central main piping system which is a piping system equipped with jet nozzles (117) designed to distribute the chemical solution to biomass. The system further comprises a Kappa analyzer (115, 125, and 135, respectively) at each stage to determine the pulping percentage.

According to a preferred embodiment of the present invention, the system further comprises at least one tank baffle which is designed to increase mixing efficiency. Each of the vessels (110, 120, 130) in the system further comprises a cone bottom (113, 123, 133, respectively) which is desirable for easier reaction mixture discharging from one vessel to the next.

According to a preferred embodiment. or the present invention, the system further comprises a top mount agitator (127, 137) which is designed to provide the desired agitation to the reaction mixture in the said second vessel (120) and third vessel (130). In some cases, the mixing in the first vessel (110) is done by a paddle mixer in other cases it may be done by recirculation of the reaction mixture through a pump and jet nozzle, in other eases, there can be a combination of mixing effected by a paddle stirrer and a pump recirculation.

According to a preferred embodiment or the present invention, the system further comprises a lop mount agitator (127, 137) which is designed to provide the desired agitation to the reaction mixture in the said second vessel (120) and third vessel (130). Mixing in the first vessel (110) is done by recirculation of the reaction mixture through a pump and jet nozzle.

According to a preferred embodiment of the present invention, the process comprises a step of blending where the liquid containing a proprietary blend is routed to the reactor vessel. Subsequently, the mixer agitates the blend in the reactor during chemical addition, biomass addition, and reaction. To increase mixing, the circulation pump is used to circulate material from the mesh back to the top. The biomass is added to the reactor through the top entry port.

The delignification reaction takes place and creates an exothermic environment within the reaction vessel. The level & temperature in the Reactor is monitored. When the first stage of the reaction is completed (based on the value obtained by analysis with the Kappa Analyzer), an actuated valve is opened, and the reaction mixture is moved to the second vessel to being the second stage of the delignification process. The process is repeated for stages 2 & 3 (i.e. when there is a second and a third vessel).

Preferably, the heating of the mixture is carried out by using a glycol-water mixture heated by a boiler. The heat exchanger fluid travels through the reactor (vessel) heat exchanger & tank jacket, bypassing the chiller, to heat the reaction mixture to the desired reaction starting temperature. During biomass addition and reaction, the glycol water mixture is cooled by the chiller. The heat exchanger fluid travels through the external reactor heat exchanger & cooling jacket to maintain the desired reaction temperature.

According to a preferred embodiment of the present invention, the system further comprises an emergency shutdown procedure where if the reaction temperature increases above a certain set temperature, for example in some cases it may be set at 50° C., a control valve opens and the reactor is flooded with water thereby stopping the reaction. When such a shutdown occurs, the contents of the reactor are rerouted to the overflow tank via the circulation pump.

According to a preferred embodiment of the present invention, the system is set up to have the initial reaction temperature of the process be in the range of 20-30° C. and increase as the reaction progresses. The Temperature Transmitter submerged in the Reactor sends this value to the Temperature Control System. As the temperature increases to 50° C., the Temperature Controller sends a signal to the control valve on the water outlet line to open by 25%. According to a preferred embodiment of or the present invention, the system will, with every 1° C. increase registered by the Temperature Transmitter starting at 50° C., send a signal to the control valve to open by 25% more until fully opened at 53° C., stopping the reaction completely. Preferably, the temperature control is performed by using jet nozzle sprays which can spray uniformly the surface of the chemical-biomass mixture. The water sprayed is then mixed in with the mixture in the presence of agitators or by re-circulation of the reaction mixture (i.e. without a conventional agitator).

Figure 2:
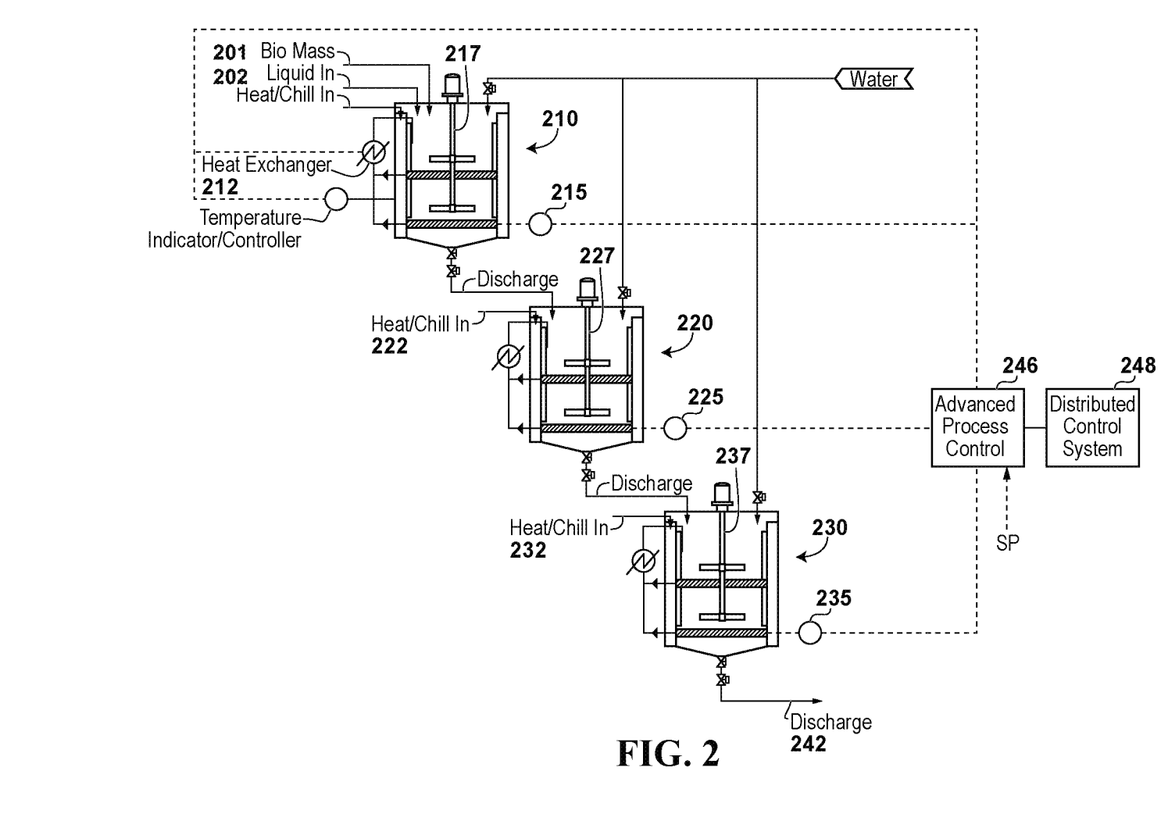
FIG. 2 shows a scaled-up system capable of performing the process according to a preferred embodiment of the present invention.

As illustrated in FIG. 2, a system according to a preferred embodiment of the present invention comprises a first vessel (210) operating at a first temperature, where said biomass (201) having a first kappa number is added and subsequently mixed with a delignification composition (202) for a pre-determined period of time or until the biomass reaches a pre-determined second kappa number, the kappa number during the reaction is measured through the use of a kappa analyzer (215). The first vessel also comprises a heat exchanger (212). The advanced process controls (246) (APC) tool is generally used for individual processes and connects to the and distributed control system (248) (DCS) which is generally in control of the entire process facility.

Preferably, once the biomass reaches a pre-determined second kappa number the biomass/delignification composition is then transferred to a second vessel (220) where the delignification reaction occurs at a second temperature which is set higher than said first temperature. Said biomass having said second kappa number continues to be mixed with said delignification composition for a pre-determined period of time or until the biomass reaches a pre-determined third kappa number, the kappa number during the reaction is measured through the use of a kappa analyzer (225) associated with said second vessel (220). The second vessel also comprises a heat exchanger (222). Preferably, once the biomass reaches said pre-determined third kappa number the biomass/delignification composition is then transferred to a third vessel where the delignification reaction occurs at a third temperature which is set higher than said second temperature. Said biomass having said third kappa number continues to be mixed with said delignification composition for a pre-determined period of time or until the biomass reaches a pre-determined fourth and final kappa number, the kappa number during the reaction is measured through the use of a kappa analyzer (235) associated with said second vessel (230). The third vessel also comprises a heat exchanger (232). Preferably, once the biomass reaches said pre-determined fourth kappa number, the reaction mixture is then discharged (242) and the solid portion is separated from the liquid portion and the liquid is recovered and re-inserted into the process by injecting it into the first vessel. The mixer used in the first vessel (210) is a paddle stirrer (217). The mixer used in the second vessel (220) is a paddle stirrer (227). The mixer used in the third vessel (230) is a paddle stirrer (237).

According to a preferred embodiment of the present invention, the biomass loading in the vessel for the delignification reaction can go up to 20 wt. %. According to a preferred embodiment of the present invention, the biomass loading in the vessel for the delignification reaction can go up to 15 wt. %. According to a preferred embodiment of the present invention, the biomass loading in the vessel for the delignification reaction can go up to 10 wt. %. Preferably, the biomass loading in the vessel for the delignification reaction can go up to 8 wt. %. More preferably, the biomass loading in the vessel for the delignification reaction can go up to 7 wt. %. According to a preferred embodiment of the present invention, the biomass loading in the vessel for the delignification reaction ranges from 4 to 6 wt. %.

According to a preferred embodiment of the present invention, the initial temperature in the vessel where the delignification occurs can be as low as 18-20° C. and still provide substantial delignification within a reasonable period of time. According to a preferred embodiment of the present invention, the initial temperature in the vessel where the delignification occurs is 25° C. More preferably, the initial temperature in the vessel where the delignification occurs is 30° C. According to another preferred embodiment of the present invention, the initial temperature in the vessel where the delignification occurs ranges from 30 to 45° C. According to yet another preferred embodiment of the present invention, the initial temperature in the vessel where the delignification occurs ranges from 32 to 40° C.

According to a preferred embodiment of the present invention, the duration of the delignification reaction can last up to 24 hours. Preferably, the duration of the delignification reaction can last up to 12 hours. Preferably, the duration of the delignification reaction can last up to 6 hours. Preferably, the duration of the delignification reaction can last up to 4 hours. According to a preferred embodiment of the present invention, the duration of the delignification reaction takes about 3 hours. In some preferred embodiments the duration of the delignification reaction may take as little as 1.5 hours.

According to a preferred embodiment of the present invention, the chemicals used in a delignification reaction may be reused in a subsequent delignification and still maintain good delignification power. According to a preferred embodiment of the present invention, the chemicals used in a delignification reaction may be reused in a subsequent delignification by adding some of the peroxide component (referred to as "topping up") and still maintain good delignification power. The recycling of the chemicals used in the delignification provides several advantages with one of the most obvious one being eliminating the discharge of spent (or used) chemicals). According to a preferred embodiment of the present invention, the chemicals used in a delignification reaction may be reused several times by topping up with peroxide between each reaction.

According to a preferred embodiment of the present invention, a valuable approach to optimize the hydrogen peroxide ($H_2O_2$) consumption is the recycling of the reaction blend after each reaction and removal of the solid cellulose by filtration. This is performed and is highly advantageous to do so since in many observed instances only 20% of the hydrogen peroxide ($H_2O_2$) added to the biomass blend is consumed. Hence, recycling the composition comprising the acid, modifier and peroxide, having a high quantity of unreacted peroxide component after the separation of the resulting cellulose substantially reduces the overall peroxide ($H_2O_2$) consumption.

According to a preferred embodiment of the present invention, good control of the reaction temperature is one of the factors in driving the delignification reaction forward which indicates that the reaction is kinetically driven. Other experiments demonstrate that a delignification reaction time of 3 hours is achieved. Those experiments carried out in a temperature ranging from 30 to 45° C. show that the desired delignification is achieved without impacting the hydrogen peroxide ($H_2O_2$) consumption and the resulting cellulose's kappa number.

According to a preferred embodiment of the present invention, the reaction temperature is in the range of 30 to 45° C. since it not only provides consistent Kappa numbers in the resulting cellulose, it also provides a consistent lignin-hemicellulose-depolymerized-organic (LHDO) mixture. It also preserves the LHDO from potential oxidation by the hydrogen peroxide ($H_2O_2$). Preferably, the produced LHDO is separated from cellulose through filtration and purified from Sulfuric acid This provides a unique organic stream that can be easily upgraded to a high value renewable fuel.

Large Scale Experiments

A series of experiments carrying out delignification using a modified Caro's acid were carried out to evaluate the feasibility of recycling the modified Caro's acid composition for continuous batch processing. It was hypothesized that continuous batch processing would also be representative of the potential to apply such a technique to continuous digestion (or delignification) of lignocellulosic biomass. The biomass used was hardwood having a kappa number of approximately 120.

Accordingly, several batches of lignocellulosic biomass were delignified using a modified Caro's acid having the following characteristics as listed in Table 1.

TABLE 1

Composition of the modified Caro's acid used in the batch experiments

| Component | Molar Ratio | Mass % |
| --- | --- | --- |
| H2O | 56 | 38.53 |
| H2O2 | 10 | 14.46 |
| H2SO4 | 10 | 41.69 |
| Taurine | 1 | 5.32 |

A first batch of biomass was mixed with the above-mentioned modified Caro's acid kept at a temperature between 32 and 37° C. for a duration of 20 hours. The kappa number at the end of the reaction was measured using a kappa analyzer and determined to be 1.04.

The remaining liquid containing the modified Caro's acid with a reduced content of peroxide was mixed to treat a second batch of biomass. The resulting mixture was kept at a temperature between 32 and 37° C. for a duration of 20 hours. The kappa number at the end of the reaction was measured using a kappa analyzer and determined to be 1.33.

The remaining liquid containing the modified Caro's acid with a reduced content of peroxide was mixed to treat a third batch of biomass. The resulting mixture was kept at a temperature ranging from 32-37° C. for a duration of 20 hours. The kappa number at the end of the reaction was measured using a kappa analyzer and determined to be 1.93.

The remaining liquid containing the modified Caro's acid with a reduced content of peroxide was mixed to treat a fourth batch of biomass. The resulting mixture was kept at a temperature between 32 and 37° C. for a duration of 20 hours. The kappa number at the end of the reaction was measured using a kappa analyzer and determined to be 2.06.

The remaining liquid containing the modified Caro's acid with a reduced content of peroxide was mixed to treat a fifth batch of biomass. The resulting mixture was kept at a temperature between 32 and 37° C. for a duration of 20 hours. The kappa number at the end of the reaction was measured using a kappa analyzer and determined to be 4.14.

The level of peroxide remaining after the treatment of the fifth batch of biomass was measured and determined to be approximately above 2%.

It has been assessed that the modified Caro's acid composition could be reused for at least another biomass delignification treatment.

On the basis of the above batch experiments, it has been determined that continuous batch treatments could be carried out to optimize delignification efficiency has well as residence time of biomass through various steps.

While the foregoing invention has been described in some detail for purposes of clarity and understanding, it will be appreciated by those skilled in the relevant arts, once they have been made familiar with this disclosure that various changes in form and detail can be made without departing from the true scope of the invention in the appended claims.

The invention claimed is:

1. A process to perform a controlled exothermic delignification of biomass, said process comprising the steps of:
    providing a system comprising at least a first vessel and a second vessel;
    providing biomass comprising lignin, hemicellulose and cellulose fibers into said first vessel;
    providing an aqueous acidic composition comprising a sulfuric acid component;
    providing a modifier component;
    providing a peroxide component;
    exposing said biomass to said sulfuric acid component, modifier and peroxide components, creating a reaction mass;
    mixing said reaction mass;
    allowing said sulfuric acid, modifier and peroxide components to come into contact with said reaction mass for a period of time sufficient to a delignification reaction to occur and remove a pre-determined amount of said lignin from said reaction mass; wherein said pre-determined amount is assessed by testing a first kappa number, with a first suitable apparatus, of the reaction mass when said first kappa number of said reaction mass is reached a first treated biomass is formed, the first treated biomass is transferred to said second vessel;
    allowing the temperature of the first treated biomass to increase during the residence time of said first treated biomass in said second vessel;
    allowing said sulfuric acid component and peroxide component to continue said delignification reaction at a second temperature and remove a second pre-determined amount of said lignin from said first treated biomass;
    wherein said second pre-determined amount is assessed by testing a second kappa number, with a second suitable apparatus, of the first treated biomass, when said second kappa number of said first treated biomass is reached a second treated biomass is formed, the second treated biomass is then removed from said second vessel;
    optionally, a washing step is employed to separate a resulting liquid portion comprising said lignin and hemicellulose from a solid portion containing the cellulose extracted from the second treated biomass, said washing step thereby forming a washed biomass.

2. The process according to claim 1, wherein said system comprises a third vessel where the second treated biomass is sent to after being removed form said second vessel,
    allowing the temperature of the second treated biomass to increase during the residence time of said second treated biomass in said third vessel;
    allowing said sulfuric acid, modifier and peroxide components to continue said delignification reaction at said third temperature and remove a third pre-determined amount of said lignin from said second treated biomass; wherein said third pre-determined amount is assessed by testing a third kappa number, with a third suitable apparatus, of the second treated biomass, when said third kappa number of said second treated biomass is reached a third treated biomass is formed, the third treated biomass is removed from said third vessel.

3. The process according to claim 2, where said process requires temperature control at said first vessel, said second vessel and said third vessel.

4. The process according to claim 3, where said temperature control comprises a heat exchanger, jacketed vessel and baffles.

5. The process according to claim 3, where said primary temperature control is a heat exchanger, secondary control is a jacketed tank and tertiary control is a baffle.

6. The process according to claim 3, where the temperature of said first vessel or said second vessel is maintained at a temperature ranging from 30-45° C.

7. The process according to claim 1, where said system has an outlet which allows the separation of solids from liquids.

8. The process according to claim 1, where said mixing in said first vessel is performed by a recirculation of the reaction mass.

9. The process according to claim 1, wherein mixing in said second vessel is performed by a paddle mixer.

10. The process according to claim 1, wherein mixing in said third vessel is performed by a paddle mixer.

11. The process according to claim 1, where said sulfuric acid component comes from a modified Caro's acid composition selected from the group consisting of composition A; composition B and Composition C;
    wherein said composition A comprises:
        sulfuric acid in an amount ranging from 20 to 70 wt % of the total weight of the composition;
        a modifier component comprising an amine moiety and a sulfonic acid moiety selected from the group consisting of: taurine; taurine derivatives; and taurine-related compounds; and
        a peroxide;
    wherein said composition B comprises:
        an alkylsulfonic acid; and
        a peroxide; wherein the acid is present in an amount ranging from 40 to 80 wt % of the total weight of the composition and where the peroxide is present in an amount ranging from 10 to 40 wt % of the total weight of the composition;
    wherein said composition C comprises:
        sulfuric acid;
        a two-part modifier component comprising:
            a compound comprising an amine moiety; and
            a compound comprising a sulfonic acid moiety; and
        a peroxide.

12. The process according to claim 1, wherein at least part of the resulting liquid portion after coming out of the second vessel is used to treat at least one additional biomass batch.

13. The process according to claim 1, wherein at least part of the resulting liquid portion after coming out of the second vessel is used to treat at least four additional biomass batches.

14. The process according to claim 1, wherein at least part of the resulting liquid portion after coming out of the second vessel is used to further treat additional biomass batches until the peroxide concentration reaches less than 1%.

* * * * *